INVENTOR:
FREDERICK W. RIEHL,
BY McGrew & Edwards
ATTORNEYS.

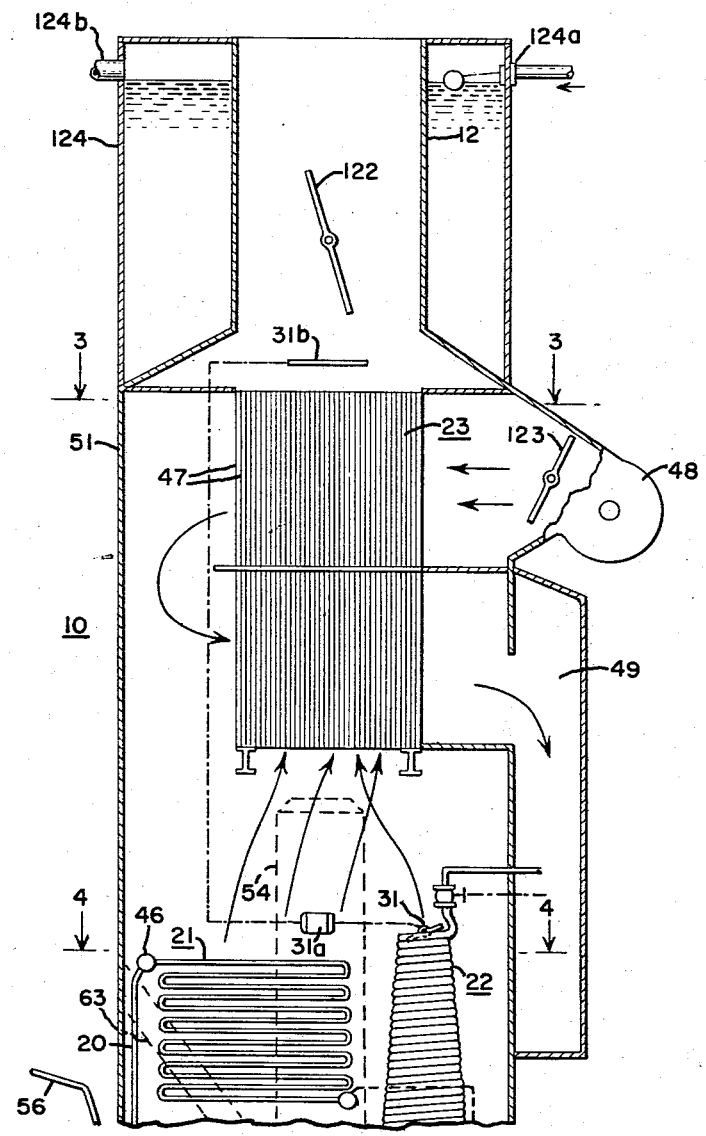

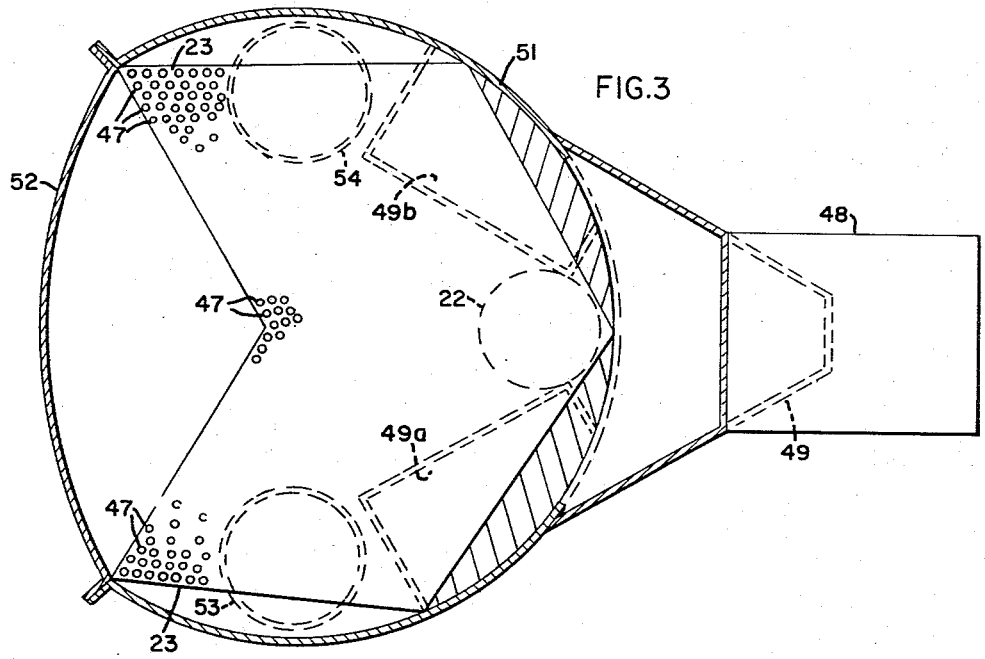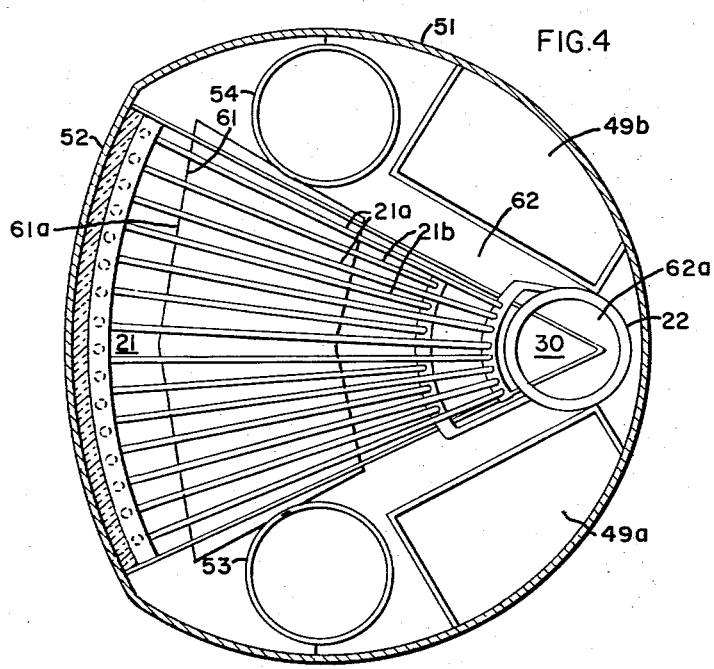

Aug. 29, 1967 — F. W. RIEHL — 3,338,219
STEAM GENERATING BOILER OR STEAM POWER PLANT
Filed Sept. 9, 1965 — 8 Sheets-Sheet 5
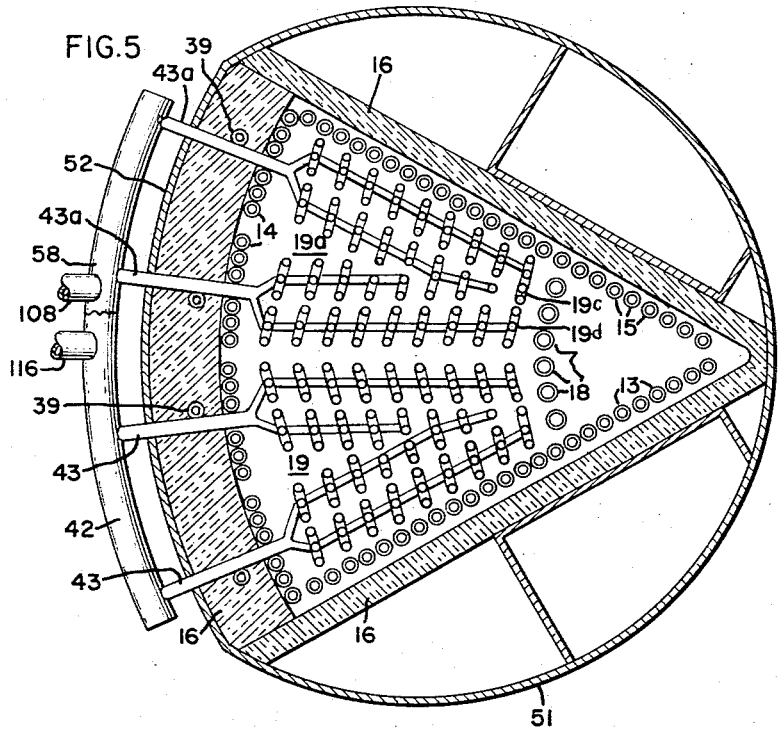
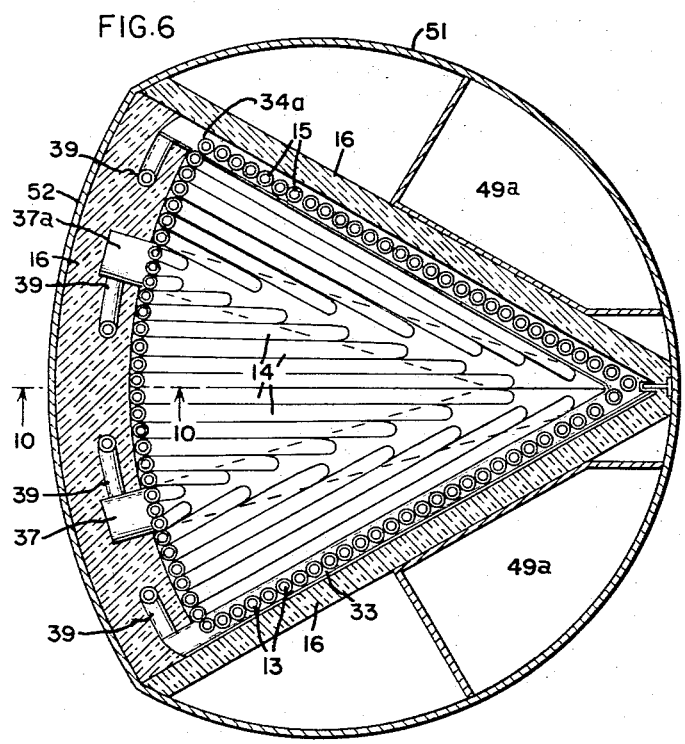
INVENTOR.
FREDERICK W. RIEHL,
BY
ATTORNEYS.

Aug. 29, 1967     F. W. RIEHL     3,338,219
STEAM GENERATING BOILER OR STEAM POWER PLANT
Filed Sept. 9, 1965     8 Sheets-Sheet 6
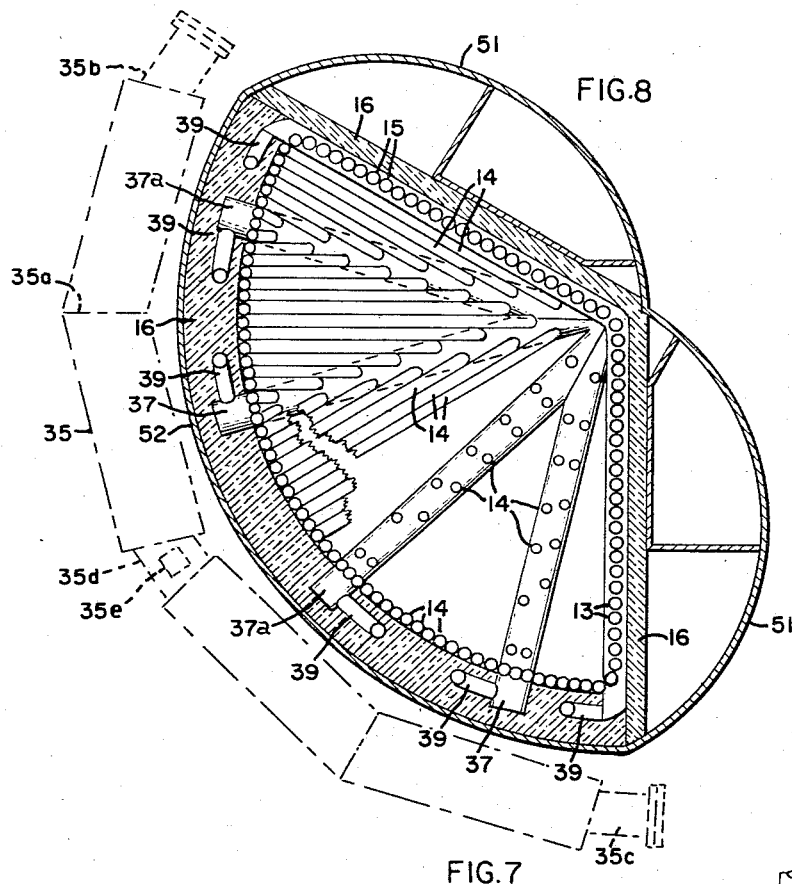
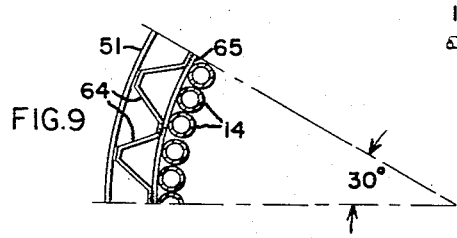
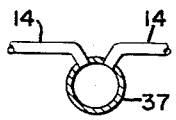
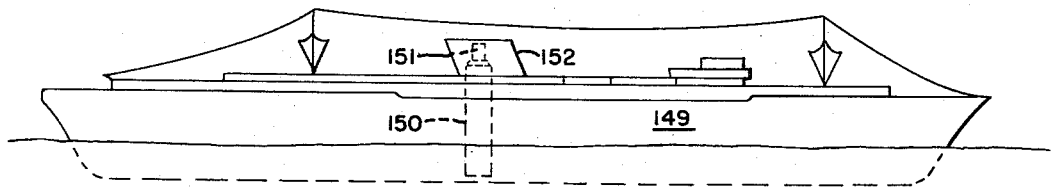
INVENTOR.
FREDERICK W. RIEHL,
BY
ATTORNEYS

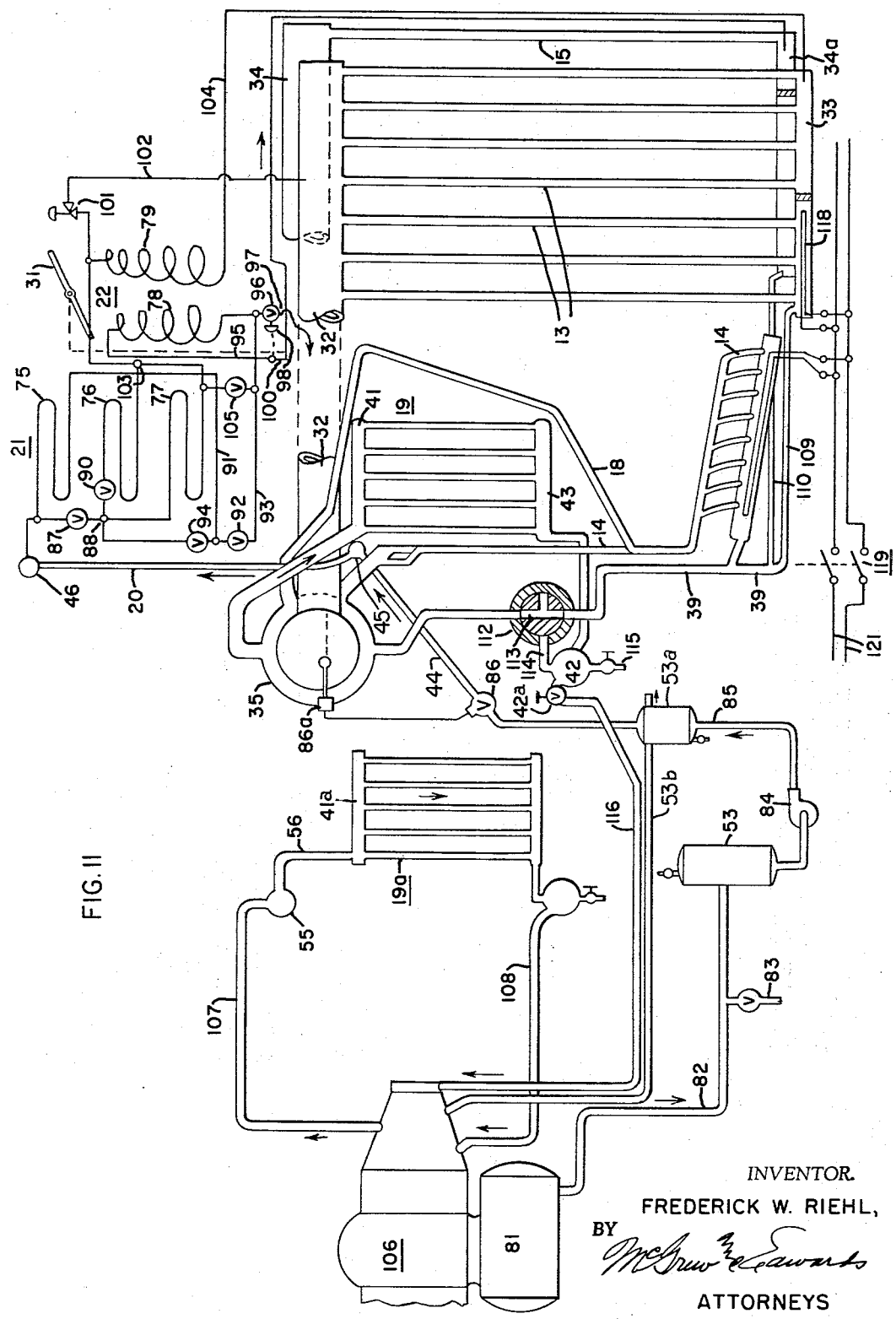

United States Patent Office 3,338,219
Patented Aug. 29, 1967

3,338,219
STEAM GENERATING BOILER OR STEAM POWER PLANT
Frederick W. Riehl, 2347 Albion St., Denver, Colo. 80207
Filed Sept. 9, 1965, Ser. No. 486,153
28 Claims. (Cl. 122—478)

This invention relates to steam boilers and particularly to high pressure boilers of the type wherein the principal components or elements of the boiler are mounted within a single upright casing which serves both as the boiler chamber and as the draft stack. The present invention is an improvement on the boiler construction disclosed in U.S. Patent No. 2,817,321 issued Dec. 24, 1957, to the same inventor.

The present invention makes it possible to build boiler capacity in steps by the addition of separate complete segmented boiler units to the initial boiler structure and include features of adjustment and control which greatly facilitate the operation of the boiler over a wide range of applications and capacities.

Modern steam power plants are required to use fuels of various types and to produce electric power at as high efficiency as possible. Very substantial savings can be realized by even a very small percentage increase in boiler efficiency or in the overall economy of a steam boiler plant. In addition to their use in large power generating stations there are many other applications for boilers where efficiency and economy are also highly important. These economy factors have been increasingly felt in the field of relatively small steam generating plants both for land and for marine applications.

The unitary boiler and draft stack assembly of the above mentioned patent lends itself to many applications where portability and ease of erection and dismantling are of significant value. The wide range of applications for small size and for portability of steam generating plants has made it desirable to provide more flexible and more readily adjusted and controlled steam generating plants. Accordingly, it is an object of the present invention to provide an improved steam generating plant of the combined boiler and draft stack type.

It is another object of this invention to provide a steam generating plant including an improved arrangement for the efficient control of the output thereof.

It is another object of this invention to provide a steam generating boiler including an improved arrangement for assuring adequate heating of any required quantity of make-up water without interruption or slowing of the effective operation of the main boiler.

It is a further object of this invention to provide a self-contained steam boiler and draft stack unit which is readily adapted to modification by the addition and incorporation of a second similar unit to provide a larger single capacity boiler.

It is a further object of this invention to provide a high pressure and high temperature steam generating plant of compact construction and including an improved arrangement for securing high efficiency while utilizing minimum deck area.

It is a further object of this invention to provide a high pressure and high temperature boiler including an improved arangement for controlling the flow of hot combustion gases to secure high efficiency operation of the boiler over a wide range of output capacity.

Briefly, in carrying out the objects of my invention in one embodiment thereof, a unitary stack and boiler assembly is constructed with one cylindrical side and two flat sides thus forming a cross section of generally triangular configuration; the components of the boiler unit, including water wall tubes, screen tubes, steam header and superheaters, are arranged within the stack in a manner which is generally similar to that of the same components as disclosed in the above identified patent. The configuration of the stack and the arrangement of the components in this embodiment facilitate the efficient operation of the boiler and further make it possible to enlarge the total capacity by adding additional boiler units of the same configuration, the adjacent flat walls of two adjacent boiler units being removed and the outside walls being joined to provide a single stack and boiler assembly.

The main water wall tubes are arranged on an outer curved portion of the wall structure and communicate directly with the main steam drum. Additional wall tubes are provided on the other two walls of the boiler and serve both to protect the walls and to provide additional steaming area.

Make-up water is passed through a preheater system included entirely within the stack structure and comprising a plurality of separate stages each subject to different combustion gas temperature conditions. By way of example, four stages may be employed, the first two stages being heated by gases after they have passed over the superheater section, the next stage by radiant heat within a hot combustion gas bypass, and the last stage both by convection and radiant heating within the side wall tubes of the boiler. The passage of hot gas through the bypass is adjusted by a damper controlled in response to the temperature of the gases in an upper portion of the stack.

Burners are arranged in the lower portion of the stack at two levels used alternatively depending upon the superheat requirement of the system, operation of the upper burners being effective to produce higher superheat.

This invention makes it possible to provide a unitary high pressure and high temperature boiler which is compact and suited to use in confined areas including marine installations where a saving of space is highly important. For marine applications the configuration of the boiler, all components of which are included in a single stack, greatly facilitates the installation in a ship with minimum use of deck space.

In one embodiment the water preheaters are on the high pressure side of the water supply system and two stages of the preheater may be connected in series or parallel relationship depending upon the load conditions to be met and, by selecting the connections of the preheater, the temperature of the make-up water may be controlled in accordance with the capacity demand of the system. In another embodiment a plurality of water preheaters and a deaerator are on the low pressure side and the heated water is supplied to the final stage and boiler by a high pressure pump. The multi-stage make-up water preheater system of this latter embodiment of the invention makes it feasible to utilize 100% cold make-up water and to bring the make-up water from a low temperature supply to saturation temperature by heating entirely within the stack assembly before it is delivered to the main steam drum.

The features of novelty which characterize this invention are pointed out with particularity in the claims annexed to and forming a part of this specification. The invention itself, however, both as to its organization and method of operation, together with further objects and advantages thereof, will be best understood upon reference to the following description taken in connection with the accompanying drawings in which:

FIGS. 1A and 1B taken together comprise a somewhat diagrammatic sectional elevation view of a boiler embodying the invention;

FIG. 3 is a sectional view along the line 3—3 of FIG. 1A;

FIG. 4 is a sectional view along the line 4—4 of FIG. 1A;

FIG. 5 is a sectional view along the line 5—5 of FIG. 1B;

FIG. 6 is a sectional view along the line 6—6 of FIG. 1B;

FIG. 7 is a sectional view of a main mud drum taken along the line 7—7 of FIG. 6;

FIG. 8 is a sectional view similar to FIG. 2 illustrating an arrangement for increasing the capacity of the boiler;

FIG. 9 is an enlarged detail sectional view taken along the line 9—9 of FIG. 1B;

FIG. 10 is an enlarged detail sectional view taken along the line 10—10 of FIG. 6;

FIG. 11 is a diagrammatic illustration of the fluid circuits of the boiler of FIGS. 1A and 1B showing one embodiment of the make-up water supply system;

FIG. 13 illustrates diagrammatically a steamship provided with a boiler embodying the invention.

Figure 1B:
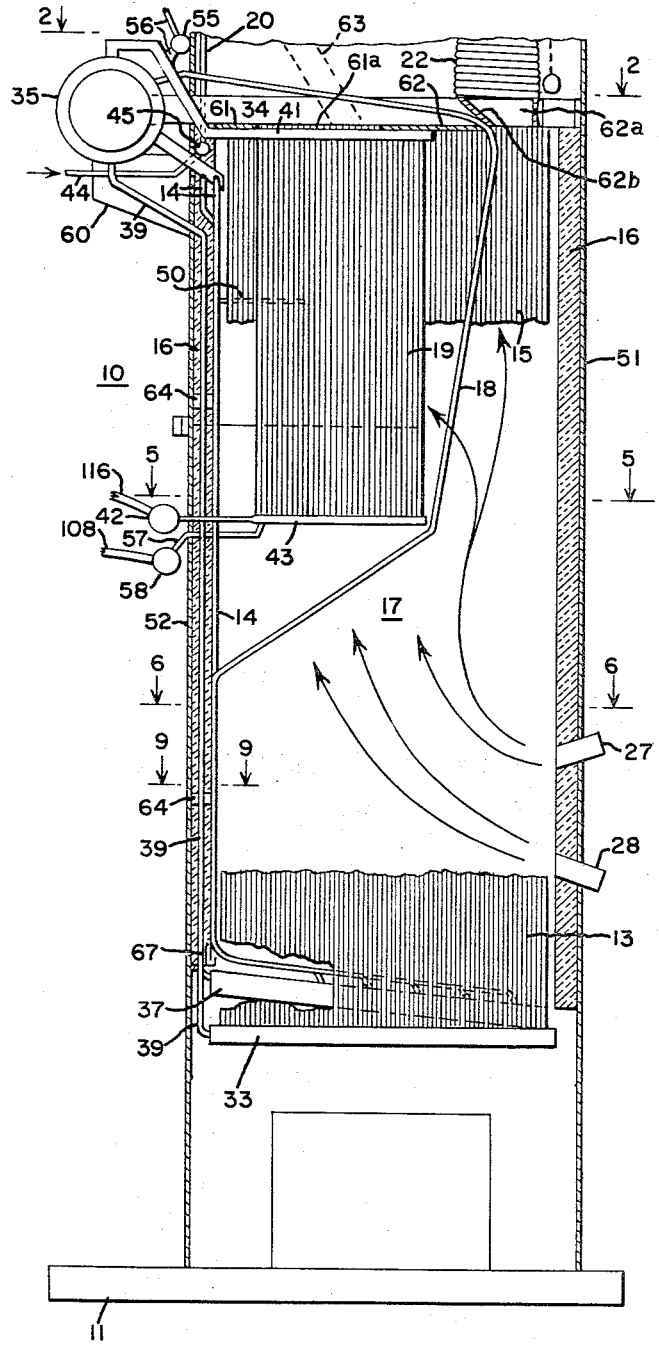

Referring now to the drawings, the steam generating boiler shown in FIGS. 1A and 1B comprises a vertical stack 10 mounted on a foundation 11 and terminating in a short or stub stack 12 of reduced cross-sectional area. Within the stack 10 there is mounted a boiler comprising sets of water wall tubes 13, 14 and 15. As shown in FIGS. 2 to 6, the cross section of the boiler as defined by the tube walls is generally triangular, the outer wall on which the tubes 14 are arranged being of cylindrical configuration so that these tubes lie in an arc about the apex of the triangle. The side walls on which the tubes 13 and 15 are mounted are flat. The sets of tubes 13, 14 and 15 are spaced from their respective walls and this space is packed with a suitable high temperature insulation such as mineral wool as indicated at 16 in FIG. 1B.

The boiler is shown in FIGS. 1A and 1B with the near outside wall broken away to expose the bank of tubes 13 and the interior of the combustion chamber indicated at 17 together with screen tubes 18 and a bank of superheater tubes 19. The screen tubes 18 begin as tubes of the lower portion of the set 14 and are bent inwardly below the superheater tubes and extend upwardly around the superheater tubes; the remaining tubes of the set 14 are spaced by bending them slightly from one another to equalize their spacing and compensate for the removal of the screen tubes.

Above the boiler are arranged a first stage bank of vertical water preheater tubes 20 and two sets or banks of water preheater tubes 21 and 22 over which the combustion gases pass after flowing through the main boiler section, and above this water preheater or economizer there is mounted an air preheater 23.

Access to the various levels of the boiler may be had from suitable platforms reached by an elevator or by stairways. These structures have not been illustrated as they are not essential to an understanding of the invention.

The boiler is provided with two burner assemblies 27 and 28; the burner 27 is arranged in an upper position at the apex opposite the arcuate wall and is directed downwardly at a small angle from the horizontal; the burner 28 is positioned at the apex below the burner 27 and is directed upwardly at a small angle from the horizontal. This arrangement of the burners makes it possible to control the temperature of the hot combustion gases rising over the superheater surfaces, a higher temperature being obtained by operation of the burner 27 than by operation of the burner 28. Each burner is designed to provide full heating capacity of the boiler and the two burners may be operated alternatively for the normal load range or capacity or both may be operated together for maximum capacity. When both burners are operated at once the flames are opposed and pancake or spread out over the cross section of the combustion chamber.

Figure 2:
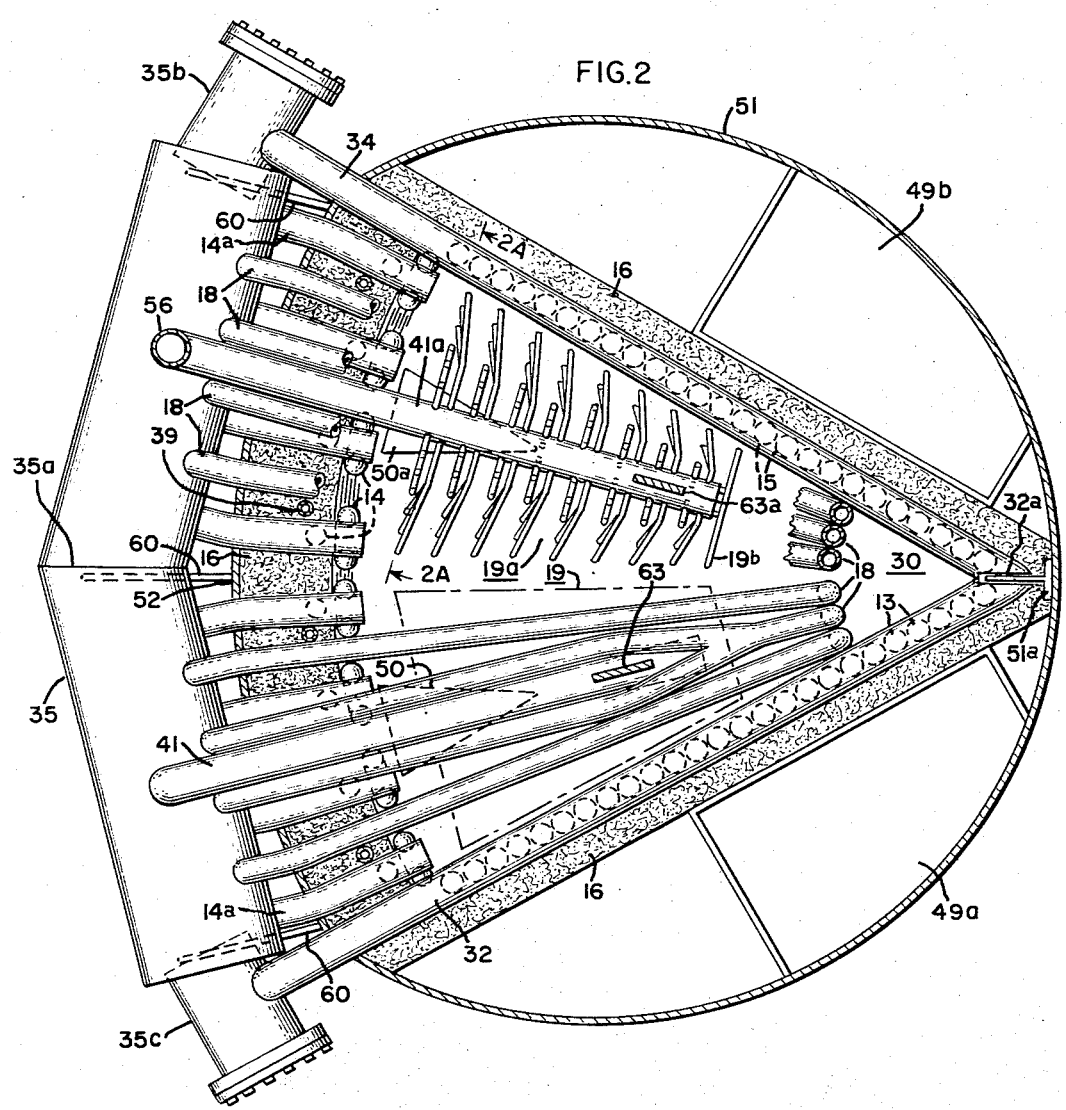
FIG. 2 is a sectional view along the line 2—2 of FIG. 1B.

It will now be apparent that the walls of the combustion chamber 17 are covered with the sets or groups of water tubes 13, 14 and 15 and that the hot combustion gases rise along the surfaces of these tubes and pass into the upper portion of the boiler and also pass between the screen tubes 18 and over the surfaces of the superheaters 19. As indicated in FIG. 2, a free gas passage 30 is formed adjacent the apex of the triangle of the cross section between the screen tubes 18 and the adjacent side walls. The hot combustion gases rise through this bypass by suitable baffles or partitions described later so that they enter the water preheater 22; this preheater is of elongated frusto-conical configuration, and the passage of the gases through the preheater 22 is controlled in accordance with stack outlet temperature by a damper 31 at the top of the preheater. The damper is moved by an electric motor 31a which is operated in response to stack temperature, a temperature sensor 31b being employed to control the motor. It will thus be apparent that the tubes of the preheater 22 are heated by radiation and convection when the gases are flowing through this preheater and substantially by radiation alone while the gases are deflected when the damper is closed; in the latter case all of the combustion gases flow through the superheater zone and upwardly through the heater 21 and thence to the air heater 23. The conical section of the heater 22 assures more complete exposure of its tubes to the radiant energy.

The wall tubes of the set 13 are arranged in closely adjacent parallel relationship between a top or steam header 32 shown in FIG. 2 and a bottom header or mud drum 33, and in a similar manner the tubes of the set 15 on the opposite flat wall are connected between a top header 34 and a mud drum 34a (shown in FIG. 6) of the same construction as the drum 33. This header and the header 32 both are connected in communication with the main steam drum indicated at 35 and thus steam generated in the sets of tubes on the flat side walls enters the main steam drum. The drum 35 is illustrated as constructed of two cylindrical tube sections with their ends cut at angles lying in the planes of radii of the boiler section and welded together at their adjacent ends along a circumferential line 35a. The ends are closed by T-sections 35b and 35c closed at their outer ends and having their stems opening into the side wall header 32. The water wall tubes 14 are connected directly into the lower half of the main steam drum 35, and the lower ends of these tubes are bent inwardly in two sets and extend along respective mud drums 37 and 37a positioned along the central axes of the sets of tubes as indicated in FIG. 6. The details of construction of the drums 37 and 37a are the same and a sectional view of the drum 37a is shown in FIG. 7.

The tubes of the set 14 and the mud drums 37 and 37a slope from the front arcuate wall downwardly toward the apex of the triangle and provide a sloping flat bottom wall for the boiler. This type of bottom wall is provided for use in boilers supplied with gas burners since facilities for collecting fly ash are not necessary in such installations.

During the operation of the boiler the water in the side wall tubes in heated and steam is generated and rises to the headers and thence flows laterally and enters the main steam drum 35. Water is returned from the main drum to the mud drums 33, 34a, 37 and 37a through a plurality of water return pipes 39 which pass downwardly in the insulation between the boiler shell and the tubes 14 and enter respective ones of the mud drums. From the main steam drum the saturated steam passes through a manifold connection or upper header 41 to the superheater indicated at 19 where it is heated further and is then discharged to a superheated steam header 42 on the outside of the stack and from which it is delivered in the usual manner to the turbine or other equipment connected to the boiler. A second superheater of the same construction is indicated at 19a and is connected to act as a reheat superheater, its header 41a being connected to receive steam discharged from an intermediate stage of a turbine as described below. The tubes comprising the superheaters 19 and 19a are connected between the upper headers 41 and 41a and respective sets of lower heads or manifolds indicated at 43 and 43a. These lower headers are connected in pairs to common outlet conduits which pass through the wall of the boiler to the header 42 and the reheat header, respectively, the wall tubes of the group 14 being bent aside sufficiently to allow the outlet conduits of the sets 43 and 43a to pass therebetween. Each superheater assembly comprises a plurality of individual banks or platens each of which is constructed by connecting a respective one of the headers 41 and 41a by groups of superheater tubes arranged in parallel between the respective upper header and a selected one of the headers of the sets 43 and 43a.

Figure 2A:
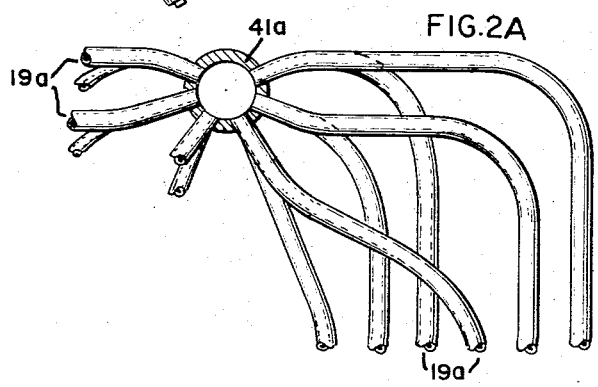
FIG. 2A is an enlarged sectional view taken along the line 2A—2A of FIG. 2.

As shown in FIGS. 2 and 2A the superheater tubes enter the header 41a, for example, in sets of three circumferentially spaced from one another. Adjacent sets of three are bent from their offset positions to align the tubes in sets of six laterally of the header. The sets of six tubes on opposite sides of the header are aligned to provide a set of twelve tubes in line. The number of tubes in each set is reduced as required toward the apex where less space is available. Thus sections of the superheaters may be cut off or disconnected for servicing purposes as individual elements so that it is not necessary to remove the whole superheater for repair or replacement purposes. Furthermore, it may be desirable to employ one or more of the superheater platens for reheat superheating and the construction facilitates their use to provide the reheat superheater in the manner described below. The two platens of the superheater 19a, for example, are arranged in a V-shaped configuration. This leaves a passage of triangular cross section adjacent the wall tubes 14 which provides a combustion gas bypass around the superheater tubes. A triangular plate 50 is mounted on a horizontal hinge along its edge adjacent the tubes 14 and may be used as a platform for servicing and also as a damper for controlling the bypass effect of the triangular passage. An access opening (not shown) is provided in the wall portion 52 adjacent the upper side of the platform 50.

Make-up water is supplied from a pipe 44 to a manifold or header 45 of the vertical preheater tubes 20 and thence to a header 46 of the preheater tubes 21; this preheater has been illustrated as having alternate long and short turns or passes 21a and 21b, respectively, and the control valves have been omitted from FIG. 4 to simplify the drawing. The water in the heater 21 is heated by gases flowing upwardly from the superheater section. At least a portion of the make-up water then passes through the heater 22 and finally enters the side wall tubes 13 and 15 adjacent the apex of the boiler section where it is heated further. This multistage circuit for heating the make-up water makes it possible in one embodiment of the invention to bring the water to saturated steam temperature without outside auxiliary units and thus the boiler may be operated with 100% cold make-up water. The connecting and operation of the coils of the preheaters and the heating of the make-up water may be controlled in accordance with the load demands on the boiler by arrangements such as those set forth in detail below in the descriptions of FIGS. 11 and 12.

The hot gases after passing over the preheater units rise through passages or tubes 47 within the air preheater 23 and thence enter the stack stub 12. Air to be heated by the preheater 23 is supplied by a blower 48 and after flowing through the upper and lower passes of the preheater is discharged into a hot air duct 49; this hot air duct extends down the stack to the zone adjacent the water preheater coils 22 where it is divided and supplied to two ducts 49a and 49b shown in the sectional views FIGS. 2-6 and which carry the air to the burners by connections not illustrated in the drawings but readily understood by those skilled in the art.

The air ducts 49a and 49b and the entire stack are enclosed in a casing 51 which is of generally circular cross section about the center of the stack; the portion of the wall 51 indicated at 52 adjacent the wall tubes 14 is of a greater radius of curvature and forms the arcuate side of the boiler cross section.

In addition to the boiler components described above, other auxiliary equipment may be included within the shell 51; for example, as shown in FIGS. 1A and 4 a make-up water deaerator 53 and a flash tank 54 may be mounted adjacent the make-up water preheaters and within the zone encased by the wall 51 adjacent the hot air ducts 49a and 49b. Suitable soot blowers (not shown) may be mounted in the combustion chamber 17 to clean the surfaces of the tubes. Furthermore, it will be understood that suitable thermal insulation (not shown) may be applied to the inner side of the stack walls 51 and 52 about the water preheaters and air heating unit 23 to further reduce the loss of heat from the system.

The boiler constructed as described above may be operated as a high pressure high temperature boiler of the marine type and for this purpose it may, for example, be desirable to provide reheat superheaters as mentioned above for reheating steam received from an intermediate stage of the turbine and supplying it to a later stage. The reheat superheaters may be provided by utilizing one of the individual superheater platens as indicated by connecting the upper header 19a, for example, to be supplied from a reheat return header 55 illustrated in FIG. 1B. Steam is supplied to the reheat header 55 from a turbine or other source, the connection being made by an upwardly bent tube as indicated at 56. This reheat circuit is shown diagrammatically in FIG. 11. After being reheated in the reheat superheaters the steam is discharged through the lower headers 43a and passes through a connection 57 to a reheat superheat header 58 mounted on the outside of the boiler casing. Thus both the main superheater 19 and the reheat superheater 19a are mounted in the same zone of the boiler.

The boiler wall tubes, superheater tubes and screen tubes are all suspended at their upper ends and their lower portions are free to move up and down upon contraction and expansion with changes in temperature. The wall tubes and headers are supported on and suspended from the wall on suitable I-beams (not shown) extending across the stack from the wall 51 to the wall portion 52, and a sloping hanger 63 is provided to support the outer or overhanging portions of the superheater structure. The main steam drum 35 is supported from the outer face of the wall portion 52 on brackets 60 as indicated in FIG. 2. The lower header 43 and the connection 57 at the lower end of the superheater pass through slotted openings in the wall 51 to afford movement of the superheaters. These supporting and mounting arrangements have not been illustrated in detail as such constructions are readily understood by those skilled in the boiler art and are not necessary to an understanding of the present invention.

The baffle arrangement for directing the flow of combustion gases over the preheaters as indicated in FIGS. 1B and 4 comprises plates 61 and 62 positioned on the superheaters and forming an opening 61a above the superheaters and below the heater 21 and an opening 62a adjacent the hot gas bypass below the heater 22. A partition 62b is provided about the passage between the opening 62a and the conical heater 22 to confine the bypass gases to the heater 22 so that all the gases from the free passage 30 flow through the coils of the heater 22 whenever the damper 31 is open. The location and configuration of the opening 61a is shown in FIG. 4, the opening 62a being indicated as in alignment with the heater 22 and the plate 62 being of a configuration to fit within the area defined by the left-hand edge of the opening 61a, the circular tanks 53 and 54, the air ducts 49a and 49b, and the opening for the heater 22.

Figure 12:
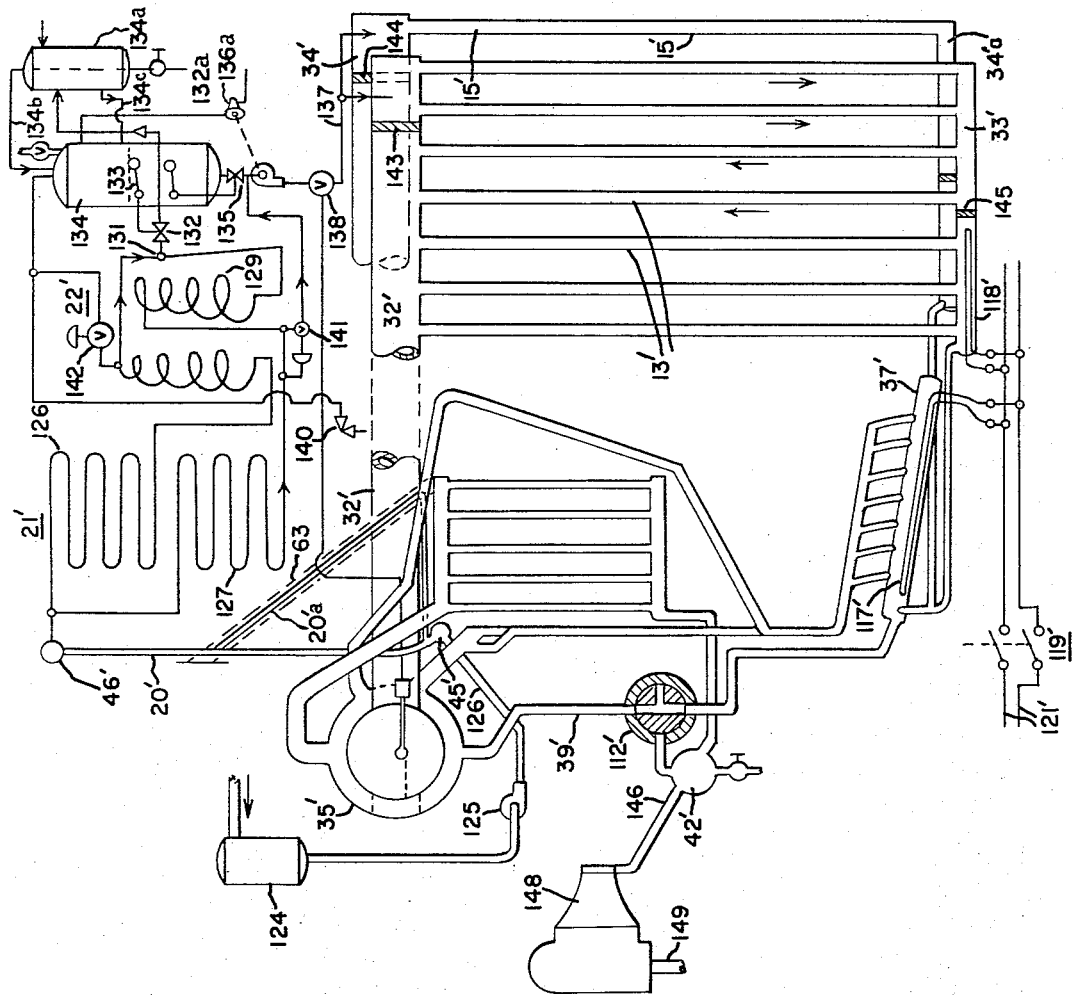
FIG. 12 is a diagrammatic illustration of the fluid circuits showing another embodiment of the make-up water supply system for use with the boiler of FIGS. 1A and 1B.

The hanger 63 which is positioned in the path of the gases flowing upwardly from the superheater may be cooled by securing thereto one or more of the pipes carrying water for the preheater; thus, by way of example, one of the pipes 20' indicated by the numeral 20'a in FIG. 12 may be carried along the hanger to provide sufficient cooling to prevent undue distortion or heat damage to the hanger.

The passage of combustion gases from the side of the superheater toward the apex is restricted considerably by a bank of tubes connected between upper and lower end headers, the upper header being indicated at 19b in FIG. 2 and the tube ends being connected to this header and extending downwardly to a two-piece cross header on the two sections of the superheater indicated at 19c and 19d in FIG. 5 where the tube ends are indicated.

In order to provide lateral support for the boiler tube structure while affording up and down movement thereof, a plurality of spacing elements or chairs 64 are mounted at vertically spaced positions on the tube structure. The construction of these chairs is shown in FIG. 9 which illustrates a portion of the chair structure on the tube groups 14. A strap 65 is welded to the tubes and the trapezoidal chairs 64 are welded to the strap and are free to slide along the outer wall or shell 51; this arrangement maintains the required spacing between the tubes and wall 51 which affords the necessary movement along the wall. Lateral stability of the side wall tube assemblies is further assured by guides which slidably engage the side wall drums adjacent the apex; the guide for the headers 32 and 34 as shown in FIG. 3 comprises a T section 51a welded to the wall 51 and having its flange engaging a vertical slot 32a formed between the ends of the headers 32 and 34.

FIG. 10 illustrates the sealing structure which is provided to prevent a flow of combustion gases into the insulation between the wall tubes and the shell 51. A baffle sheet 66 is welded along the lower end of the wall tubes 14, and similar baffle sheets are welded along the other wall tubes in a similar manner. A trough or channel 67 extends around the shell 51 and the baffle 66 enters the channel and is immersed in water 68 therein to provide a water seal between the insulation space and the combustion area. The channel 67 is carried by a shelf or bracket 70 which closes the lower end of the insulation space; the channel 67 is formed by an inner wall 71 spaced from an upturned flange 72 formed along the perimeter of the shelf. The upper edge of the wall 71 is turned toward the baffle 66 to reduce the gap over the water seal and minimize the effects of any surges of the fluids in the channels.

FIG. 8 illustrates the manner in which the total capacity of the boiler may be increased by opening the flat side wall containing the tubes 13 and attaching a second boiler section without a side wall corresponding to the side wall 15 so that an overall section of ellipsoidal or elongated cross section is constructed and which comprises an arcuate wall of twice the former length of the arcuate wall and two flat side walls of the same dimensions as those of FIGS. 2–6. It will therefore be apparent that, after a boiler has been installed and it is wished to increase its capacity, this may readily be done by adding a second similar unit on the same foundation and connecting it by removing one of the original flat side walls and securing a second unit in position in the manner described. The main steam drum of the second unit is of the same construction as that of the first and is added by removing the closed T or stub 35c of the first drum. The drums are then joined by welding a connection 35d between the ends of the two arms. The connection 35d is provided with an access cover or manhole 35e.

The steam generating system of this invention makes it possible to effect the control of the operating characteristics of the system within narrow ranges. For example, the outlet temperature of the gases leaving the stack may be effectively maintained at relatively low values thereby operating the system at higher efficiency. This outlet temperature control is effected by employing the hot gas bypass damper control 31b to prevent lowering of the temperature of the exhaust gases below the dew point. The exhaust gas temperature is further effected by the water preheaters which return heat to the system; the system also employs a control of the burners both in capacity of the burners and in selection of burners located at the upper and lower levels. One manner in which the control of the system may be accomplished is indicated in FIG. 11 which is a diagrammatic illustration of the various functional parts of the boiler circuit and a control system; this figure also illustrates an arrangement of the reheat cycle for returning steam from the first stage of a steam turbine for superheating and subsequent supply to an intermediate stage.

In FIG. 11 the make-up water heating system is shown as comprising the tubes 20 and the tubes 21a and 21b of the preheater 21 connected to provide three coils or individual circuits 75, 76 and 77 and the tubes of the preheater 22 comprising two coils 78 and 79. The coils 75, 76 and 77 are of short length as compared with the coils 78 and 79 and have substantially less heat transfer surface. The coils of the heater 21 and of the heater 22 are arranged in this embodiment so that they may be connected either in series or in parallel relationship depending upon the load demands of the system.

The water preheating system for the boiler illustrated in FIG. 11 may, for example, be constructed to have a capacity sufficient to bring water supplied from an auxiliary heater to the header 45 at, say 400° F. to saturation temperature before it is supplied to the main steam drum 35. The make-up water for the system is supplied from a condenser 81 through a conduit 82 and also may be supplied from a low temperature water main or other source through a conduit 83. The make-up water is then conducted through the deaerator 53 and a high pressure feed water pump 84 and through a conduit 85 under control of a valve 86, whence it flows through the pipe 44 and enters the header 45.

In order to supply additional heat to the make-up water a heater 53a may be arranged in the conduit 85, this heater being supplied with heat by bleed steam taken from a turbine and delivered through a pipe 53b or from any suitable source and controlled to provide the required output temperature for supply to the header 45. From the header 45 the make-up water flows through the coils of the preheaters 20, 21 and 22 in a manner determined by the settings of the various valves of the system. The valve 86 is actuated by a float 86a in the main steam drum 35 to maintain a predetermined water level therein.

When the system is operating under normal load, a parallel connection of the heaters 21 and 22 is employed. Under this condition of operation water flows from the valve 86 into the coil 20 and thence to the coil 75 and also through an open valve 87 into a distributor 88 and through the coils 76 and 77 in parallel, a valve 90 being open.

The water which flows through the coil 75 is heated and discharged through a line 91 and through an open valve 92 to a line 93 and thence through the coil 78 of the heater 22. A valve 94 adjacent the valve 92 is closed during this connection of the heaters. From the coil 78 the heated water flows through a pipe 95 into the mud drum 34a supplying the set of water tubes 15. A normally closed bypass valve 96 is provided in a line 97 connecting the inlet to the coil 78 and the drum 32 and is opened in response to excessive temperature by a thermal control 98 connected to be responsive to the temperature in the line 95 on the outlet side of the coil 78 at a point indicated at 100.

In addition, a high pressure relief valve 101 is provided between the outlet of the coil 79 and the main steam drum and when this valve is opened fluid is discharged through a pipe 102 to the drum 32 which is in open communication with the main steam drum.

The make-up water flows from both coils 76 and 77 into a T connection 103 and then in series through the coil 79 of the heater 22 from which it flows through a pipe 104 into the mud drum 33 for the set of water tubes 15.

It will now be apparent that, with the coils of the heaters 21 and 22 connected as just described, make-up water is heated first in the tubes 20 then the coils 75, 76 and 77 and then flows into the coils 78 and 79 in a manner such that the coils 75 and 78 are in series and the coils 76 and 77 in parallel are in series with the coil 79. Thus two parallel paths are provided, one providing heating of the make-up water in two stages and then it is supplied to the mud drum 33 and the other supplying the heated water to the mud drum 34a.

The circuit arrangement just described is designated the "parallel flow connection" and is employed for less than full capacity operation of the boiler. The heating of the coils 75, 76 and 77 by the gases which have passed over the superheaters and of the coils 78 and 79 by gas flowing through the bypass or by radiant heating from the gas flowing through the bypass and then into the heater 21 raises the make-up water to a temperature such that when it is introduced into the lower mud drums 33 and 34a it may be heated to its saturation temperature on passage through the right-hand ones of the heater tubes 13 and 15, respectively. Thus four-stage heating of the make-up water has been provided, the first stage being in the tubes 20 and the fourth stage being within the boiler in the water wall tubes. Thus the make-up water is introduced to the main steam drum at a temperature sufficiently high to prevent lowering of the temperature of the water in the main drum.

When a greater than normal or average boiler capacity is required, the connections of the coils of the heaters 21 and 22 are changed to a series flow connection which provides the full capacity for make-up water supply. When high capacity is required in this manner, the valves 87 and 92 are closed and the valve 94 and a valve 105 between the outlet of the coil 77 and the line 93 are opened.

The make-up water now flows through the coil 75 and thence through the pipe 91 and valve 94 through the connection 88 to the coils 76 and 77 and thence flows through the valve 105 and line 93 to the coil 78 and through the connection 103 to the coil 79. The flow is thus divided and supplied from the outlets of the coils 78 and 79 to the mud drums 33 and 34a, respectively, of the side wall tube sets. The water thus flows in series through the coil 75 and the two coils 76 and 77 in parallel before it is supplied to the coils of the heater 22 and is heated in the heater 21 to a higher temperature than in the first connection arrangement. The bypass valve 96 and the relief valve 101 function in the same manner as previously.

The passage of gas through the heater 22 is controlled by the damper 31 which when open affords a flow of the hot gas from the bypass 30 through the heaters and when closed effectively prevents the flow of hot gases through the heater 22. However, because the bottom of the heater 22 passage is open, the coils 78 and 79 are subject to heating by radiant energy from the hot gases below.

FIG. 11 also illustrates the manner in which the superheaters may be connected either as main superheaters or as reheat superheaters, the main superheater 19 being shown to the right of the main steam drum 35 and the reheat superheater 19a to the left where it is connected to receive steam exhausted from an initial stage of a turbine 106 through a pipe 107 and to deliver superheated reheat steam from the reheat header 55 through a pipe 108 to an intermediate stage of the turbine. In this diagrammatic illustration of the superheaters it will be understood that both the main superheater and the reheat superheater are arranged as described above and located between the main water wall tubes 14 and the screen tubes 18. The water from the main drum is returned through the return water pipes 39 to the mud drums 37 and 37a, only the drum 37 being indicated in FIG. 11, and also to the mud drums 33 and 34a through connections 109 and 110, respectively.

Steam exhausted from the turbine 106 passes into the condenser 81 and, as indicated previously, the condensate is returned through pipe 82 and the pump 84 to the make-up water supply line 85.

When the operation of the boiler is to be started, heat is supplied by one of the sets of burners 27 and 28 and the hot combustion gases rise through the stack and over the wall tubes, screen tubes and superheater tubes. In order to prevent damage to the superheater due to over-heating before steam is available, a valve 112 is provided in one of the downcomer tubes 39 to supply water to the superheater 19 through a T-shaped passage 113, a connection 114 and the header 42, this flow of water being effected when the valve is turned counterclockwise 90° from its position as illustrated. A valve 42a is also closed to prevent discharge of water to the steam supply line 116. When the superheater is connected to the water return tube 39 in this manner, water flows into the superheater and floods it to the level of the water in the steam drum 35. With water present in the superheater tubes, damage to these tubes is prevented and the boiler may be brought up to the required temperature for the production of saturated steam whereupon the valve 112 is returned to its position as shown in FIG. 11 and a drain valve 115 is opened so that the water flows into the header 42 and out through the drain valve. When the superheater has been drained, valve 115 is closed and valve 42a opened and the boiler is ready for operation to supply superheated steam to the turbine 106 through the discharge line 116.

During the intervals between operation of the boiler, the temperature of the water in the boiler may be maintained close to boiling by energization of a plurality of electric heaters arranged in the mud drums. Two of these heaters have been indicated in FIG. 11 at 117 in the mud drum 37 and at 118 in the mud drum 34. Similar heaters may be provided in the mud drums 34a and 37a. The heaters are energized by closing a switch 119 which connects the electrical leads of the heaters to a suitable power source through lines 121. When the temperature of the water has been maintained by the electric heaters and it is desired to start the operation of the boiler, the heaters are turned off and the burners 27 and 28 started, whereupon the boiler is quickly brought up to steaming temperature. Thus, the electric heaters may be employed to minimize the time required for start-up.

In addition to the controls indicated in FIG. 11, the flow of gases out of the stack 12 may be controlled by a damper 122 and the flow of air over the tubes of the preheater 23 may be controlled by a damper 123 at the outlet of the fan 48. These dampers which may be controlled automatically afford further adjustment of the temperature conditions of the system and render the system more flexible for operation under a wide range of load conditions. No automatic control devices from the damper 122 and 123 have been illustrated; however, this type of control is well known in the art and these details are not essential to an understanding of the invention.

FIG. 12 illustrates a second embodiment of the control for the water preheating system. In this figure the boiler structure is identical with that employed in the previous figures and the components have been designated by the same numerals as those employed in FIG. 11 but primed. The system of FIG. 12 is designed for operation to utilize all of the steam generated for heating, by way of example, or in some other manner wherein the steam is dissipated and the system does not employ the turbine and reheat cycles shown in FIG. 11. Make-up water for the boiler is supplied from a suitable source through a tank 124 and is supplied to the preheaters by a low pressure pump 125 through a line 126 connected to the header 45' of the preheater tubes 20'. Water then flows through the header 46' into the coils of the preheater section 21' which have been illustrated diagrammatically as two coils 126 and 127 having their inlets connected to the header 46' and their outlets connected respectively to coils 128 and 129 of the heater 22'. With the connection of the coils of the preheater units 21' and 22' as shown, the water flows through two parallel paths, each including a coil of the heater 21' and a coil of the heater 22'.

When the tank 124 is thus employed for the make-up water supply it may be constructed in doughnut or toroidal form about the stub stack 12 as shown in FIG. 1A. Suitable float controlled supply and open overflow connections 124a and 124b, respectively, are provided as indicated and the outlet of the tank (not shown) is connected through the pump 125 to supply water to the header 45' of the preheater 20'. The tank 124 when mounted in this position forms an integral part of the boiler assembly mounted on the common base; furthermore the water in the tank thus may receive heat from the stub stack gases, if desired.

The heaters 128 and 129 are connected for opposite flow, the water flowing through the coil 128 in the same direction as the rising gases and the water in the coil 129 flowing in counterflow to the gases. The outlets of the coils 128 and 129 are connected to a T 131 and water flows from the two parallel paths through a valve 132 controlled by a float mechanism 133 in the low pressure deaerator tank 134. The water then flows to a flash tank 134a through a nozzle 132a where a portion is turned to steam and is delivered to the deaerator 134 through a connection 134b. Water collecting in the tank 134a flows to the deaerator through an overflow 134c. Additional steam may be supplied to the deaerator 134 through a line 139 from the header 32' under control of a constant pressure valve 140. Thermal relief valves 141 and 142 are provided between the outlets of coils 127 and 128 and the inlet and outlet sides, respectively, of the deaerator 134.

The heater water from the tank 134 is discharged through a valve 135 to the inlet of a pump 136 which supplies the water to a conduit 137 under control of a valve 138. The pump 136 is driven by a steam turbine 136a, the steam discharged from the turbine being supplied to the deaerator. The conduit 137 is divided or branched and discharges the water into both the side wall headers 32' and 34'. These headers are provided with partition walls 143 and 144, respectively, which form entry headers at the right ends of the main headers and direct the water downwardly through two end tubes of the banks of wall tubes 15' and 13'. The water admitted to the two end tubes flows downwardly into the mud drums 34a' and 33' and is then directed upwardly through the next two tubes of the bank by partitions in the mud drums, the partition of the drum 33' being indicated at 145. Thus the four end wall tubes of the tanks of tubes 13' and 15' are employed as water preheating tubes through which the preheat water flows before it reaches the main steam drum. This arrangement assures adequate heating of the make-up water to bring the water to saturation temperatures before it is introduced into the main drum and makes it possible to operate the boiler with 100% low temperature make-up water, the temperature of the water from the source being as low as about 50° F. The operation of the boiler is the same as that of the boiler illustrated in FIG. 11 and the superheated steam is discharged into the superheater header 42' and thence is delivered through a superheated supply conduit 146 for use. If desired a turbine 148 may be supplied from the line 146 to deliver auxiliary power to the exhaust from this turbine supplied through a line 149 for use as plant steam for heating and the like.

The water preheater of FIG. 12 thus provides a low pressure stage and a high pressure stage. The heaters 20', 21' and 22' all on the low pressure side thus may be of relatively lightweight construction while the heavy wall tubes are utilized as the high pressure stage. A very substantial saving in the weight of the boiler assembly is effected by this arrangement; this saving in weight on the high pressure heater may be in a ratio of as high as ten to one.

The water system illustrated in FIG. 11 can, for example, be designed to operate with a 2% make-up water supply at a cold water temperature of, say, 50° F. and a condensate return supply comprising 98% of the make-up water at, say, 80 to 100° F., the combined cold water and condensate being heated after passage through the feed water pump to, say, 400° F. This heating may be accomplished, for example, by bleed steam taken from the turbine. Thus all the heat required by the system is generated from the fuel supplied to the boiler.

The system of FIG. 12, on the other hand, may be designed to operate as an open system with a boiler water supply comprising 100% make-up at cold water temperatures of the order of 50° F. The entire make-up water supply is heated to steam saturation temperature and purified in the flash tank and deaerator entirely within the unitary boiler which operates without any outside heat source. By way of example, this boiler is particularly suitable for operations such as that in the petroleum industry where large amounts of steam are required for thermal secondary oil recovery processes.

The high pressure high temperature steam boiler described above is particularly suited to applications where it is desirable to employ a minimum of floor space or ground area and, by way of example, this boiler may be employed to advantage as the power plant of a steamship 149 as indicated in FIG. 13 where the position of a boiler embodying the invention is indicated in dotted lines at 150, the stub stack of the boiler indicated at 151 being positioned within the dummy or false stack 152 of the steamship 149.

While the invention has been described in connection with specific arrangements of boiler structure and circuit and control connections, various modifications and other applications will occur to those skilled in the art. Therefore, it is not desired that the invention be limited to the details of construction illustrated and described and it is intended by the appended claims to cover all modifications which fall within the spirit and scope of the invention.

I claim:

1. A steam generating boiler comprising an upright shell of generally three sided cross section, burners for the combustion of fuel positioned in the lower portion of said shell, said shell being effective as a draft stack to induce convection currents of hot gases upwardly therethrough from said burners, a plurality of wall tubes in said shell adjacent the walls thereof, superheater tubes within said shell disposed inwardly from one wall and extending toward the opposite apex of the cross section of the shell and leaving a free gas passage lying between said superheater tubes and said wall tubes adjacent said apex, said superheater tubes extending a substantial vertical distance along said shell coextensively with a substantial portion of said wall tubes and being exposed to convection currents of hot gases rising from said burners, a steam drum mounted adjacent the outer side of said shell and connected in direct communication with the upper ends of all of said tubes to receive fluid from said wall tubes and to supply fluid to said superheater tubes, a superheat steam drum connected to the lower ends of said superheater tubes to receive superheated steam therefrom for delivery to a point of use, and means for feeding make-up fluid medium to the lower ends of said wall tubes, the side walls extending from said apex to said one wall being flat and the wall tubes on each lying in the same respective plane.

2. A steam generating boiler as set forth in claim 1 including means for controlling the relative amounts of hot gas passing upwardly over said superheating tubes and gas passing upwardly through the free passage adjacent said apex.

3. A steam generating boiler comprising an upright shell of generally three sided cross section, burners for the combustion of fuel positioned in the lower portion of said shell, said shell being effective as a draft stack to induce convection currents of hot gases upwardly therethrough from said burners, a plurality of wall tubes in said shell adjacent the walls thereof, superheater tubes within said shell disposed inwardly from one wall and extending toward the opposite apex of the cross section of the shell and leaving a free gas passage lying between said superheater tubes and said wall tubes adjacent said apex, said superheater tubes extending a substantial vertical distance along said shell and being exposed to convection currents of hot gases rising from said burners, spaced screen tubes extending upwardly between said superheater tubes and said apex for containing fluid medium of intermediate enthalpy to protect said superheater tubes from excessive temperatures of gas passing through the free passage adjacent said apex, said screen tubes being substantially spaced from said apex and leaving a substantial free gas passage, a steam drum mounted adjacent the outer side of said shell and connected in direct communication with the upper ends of all of said tubes to receive fluid from said wall tubes and said screen tubes and to supply fluid to said superheater tubes, a superheat steam drum connected to the lower ends of said superheater tubes to receive superheated steam therefrom for delivery to a point of use, and means for feeding make-up fluid medium to the lower ends of said wall tubes and said screen tubes, the side walls extending from said apex to said one wall being flat and the wall tubes on each lying in the same respective plane.

4. A unitary steam generating boiler and draft stack assembly comprising an upright shell, burners for the combustion of fuel positioned in the lower portion of said shell, said shell being effective as a draft stack to induce convection currents of hot gases upwardly therethrough from said burners, a plurality of wall tubes arranged about the interior of said shell adjacent the walls thereof and subject to heating by hot gases rising through said shell, header means connected in communication with the upper end of said tubes to receive fluid therefrom and to supply steam for delivery to a point of use, a make-up water heater mounted in said shell above said tubes in the path of gases rising through said shell, means for supplying make-up water to said heater, means for supplying heated make-up water from said heater to the lower ends of said wall tubes whereby make-up water is heated in two stages the first in said heater and the second in said wall tubes prior to its admission to said header means, said make-up heater comprising two portions arranged in side by side relationship in the path of the combustion gases, the first of said portions comprising a plurality of sections, and means for selectively connecting said sections in the path of make-up water whereby the capacity of said heater may be adjusted.

5. A unitary steam generating boiler and draft stack assembly comprising an upright shell, burners for the combustion of fuel positioned in the lower portion of said shell, said shell being effective as a draft stack to induce convection currents of hot gases upwardly therethrough from said burners, a plurality of wall tubes arranged about the interior of said shell adjacent the walls thereof and subject to heating by hot gases rising through said shell, header means connected in communication with the upper ends of said tubes to receive fluid therefrom and to supply steam for delivery to a point of use, a make-up water heater mounted in said shell above said tubes in the path of gases rising through said shell, means for supplying make-up water to said heater, and means for supplying heated make-up water from said heater to the lower ends of said wall tubes whereby make-up water is heated in two stages the first in said heater and the second in said wall tubes prior to its admission to said header means, said wall tubes being arranged in a plurality of sections, individual mud drums connected to the bottoms of said tubes in the respective ones of said sections and said make-up water heater being connected to supply water to a predetermined one of said sections.

6. A unitary steam generating boiler and stack assembly as set forth in claim 5 wherein said make-up water heater comprises two units each having a plurality of separate water-circulating paths, means for connecting the water circulating paths of the first of said units selectively in series with a selected one of the paths of the second of said units whereby the capacity of said heater may be adjusted, and means connecting each of the paths of said second unit to a respective one of said mud drums.

7. A unitary steam generating boiler and draft stack assembly comprising an upright shell of substantially uniform cross section and having a stub stack of reduced cross section at the top thereof, burners for the combustion of fuel positioned in the lower portion of said shell, said shell being effective as a draft stack to induce convection currents of hot gases upwardly therethrough from said burners for discharge through said stub stack, a plurality of wall tubes arranged about the interior of said shell adjacent the walls thereof and subject to heating by hot gases rising through said shell, header means connected in communication with the upper ends of said tubes to receive fluid therefrom and to supply steam for delivery to a point of use, a make-up water heater mounted in said shell above said tubes in the path of gases rising through said shell, means including a water storage tank constructed about said stub stack in heat transfer relationship with gases discharged therethrough from said shell for supplying make-up water to said heater, and means for supplying heated make-up water from said heater to the lower ends of separate predetermined ones of said wall tubes whereby make-up water is heated in three stages the first in said tank the second in said heater and the third in said ones of said wall tubes prior to its admission to said header means.

8. A unitary steam generating boiler and draft stack assembly comprising an upright shell, burners for the combustion of fuel positioned in the lower portion of said shell, said shell being effective as a draft stack to induce convection currents of hot gases upwardly therethrough from said burners, a plurality of wall tubes arranged about the interior of said shell adjacent the walls thereof and subject to heating by hot gases rising through said shell, header means connected in communication with the upper ends of said tubes to receive fluid therefrom and to supply steam for delivery to a point of use, a make-up water heater mounted in said shell above said tubes in the path of gases rising through said shell, means for supplying make-up water to said heater at a predetermined low pressure, a deaerator tank, means for supplying water from said heater to said tank and for reducing the pressure thereof to produce flashing of a portion of the water, means including a high pressure pump for delivering heated water from said deaerator to predetermined separate ones of said wall tubes, said means for directing the preheated water through said ones of said wall tubes to said header means whereby the make-up water is heated by combustion gases first in a low pressure stage and then in a high pressure stage.

9. A unitary steam generating boiler and draft stack assembly comprising an upright shell, burners for the combustion of fuel positioned in the lower portion of said shell, said shell being effective as a draft stack to induce convection currents of hot gases upwardly therethrough from said burners, a plurality of wall tubes arranged about the interior of said shell adjacent the walls thereof and subject to heating by hot gases rising through said shell, header means connected in communication with the upper ends of said tubes to receive fluid therefrom and to supply steam for delivery to a point of use, a make-up water heater mounted in said shell above said tubes in the path of gases rising through said shell, means for supplying make-up water to said heater at a predetermined low pressure, a deaerator tank, means for supplying water from said heater to said tank and for reducing the pressure thereof to produce flashing of a portion of the water, means including a high pressure pump for delivering heated water from said deaerator to predetermined ones of said wall tubes, means for directing the preheated water through said ones of said wall tubes to said header means whereby the make-up water is heated by combustion gases first in a low pressure stage and then in a high pressure stage, and means dependent upon the level of water in said header means for controlling the supply of make-up water to said boiler.

10. A steam generating boiler comprsing an upright shell of substantially uniform cross section, burners for the combustion of fuel positioned in the lower portion of said shell, said shell being effective as a draft stack to induce convection currents of hot gases upwardly therethrough from said burners, a plurality of wall tubes in said shell adjacent the walls thereof, superheater tubes within said shell disposed inwardly from the wall on one side of the shell and extending over a major portion of the cross section and leaving a free gas passage lying between said superheater tubes and the wall tubes adjacent the side opposite said one side, said superheater tubes extending vertically a substantial distance along said shell and being exposed to convection currents of hot gases rising from said burners, header means connected in communication with the upper ends of all of said tubes to receive fluid from said wall tubes and to supply steam to said superheater tubes, means for collecting superheated steam from the lower ends of said superheater tubes for delivery to a point of use, a first make-up water heater mounted above said superheater tubes for the circulation of hot gases thereover after their passage over said superheater tubes, a second make-up water heater connected in series with said first heater and mounted above said free gas passage for the passage of hot gases thereover from said free passage, said second water heater being subject to radiant heating by gases in said free passage, means for controlling the passage of gases over said second heater from said free passage for adjusting the average temperature of gases discharged from said heaters, means for controlling the pressure in said first and second heaters, means dependent upon the level of water in said header means for controlling the make-up water supplied to said heaters, a deaerator connected to receive water from said second heater and to reduce the pressure to produce partial flashing, means including a high pressure pump for delivering water from said deaerator to predetermined ones of said wall tubes, and means directing water in said ones of said wall tubes to said header means whereby the make-up water is heated by the combustion gases first in a low pressure stage and then in a high pressure stage.

11. A steam generating boiler comprising an upright shell of substantially uniform cross section throughout its length, burner means for the combustion of fuel positioned in the lower portion of said shell, said shell being effective as a draft stack to induce convection currents of hot gases upwardly therethrough from said burner means, a plurality of wall tubes in said shell adjacent the walls thereof for containing fluid medium of low enthalpy to protect the walls from excessive heat, superheater tubes within said shell disposed inwardly from one portion of the wall of said shell and extending toward the opposite side thereof and leaving a free gas passage adjacent the inward ends of said superheater tubes, said superheater tubes extending vertically a substantial distance along said shell and being exposed to convection currents of hot gases rising from said burner means, steam drum means adjacent the upper ends of said tubes for receiving fluid medium from said wall tubes and for supplying steam to said superheater tubes, said wall tubes in the lower portion of said shell lying in side by side relationship and predetermined ones thereof spaced from one another and having groups each of a plurality of wall tubes between them being bent inwardly and extending between said superheater tubes and said free passage and constituting screen tubes, the upper portions of said screen tubes extending back to the wall in their respective vertical planes, each group of said wall tubes between said screen tubes being connected together at their upper ends to a respective common outlet tube and said outlet tube extending through said shell to said steam drum, and said screen tubes extending through said shell above respective groups of said wall tubes, and means for receiving superheated steam from said superheater tubes for delivery to a point of use.

12. A steam generating boiler comprising an upright shell of substantially uniform cross section, burners for the combustion of fuel positioned in the lower portion of said shell, said shell being effective as a draft stack to induce convection currents of hot gases upwardly therethrough from said burners, a plurality of wall tubes in said shell adjacent the walls thereof, superheater tubes within said shell disposed inwardly from one wall and extending toward the apex of the cross section formed by the other two walls and leaving a free gas passage lying between said superheater tubes and said wall tubes adjacent said apex, said superheater tubes extending a substantial distance along said shell and being exposed to convection currents of hot gases rising from said burners, means connected in communication with the upper ends of all of said tubes to receive fluid from said wall tubes and to supply steam to said superheater tubes, means for collecting superheated steam from the lower ends of said superheater tubes for delivery to a point of use, a first bank of make-up water heating tubes mounted above said superheater tubes for the circulation of hot gases thereover after their passage over said superheater tubes, a second bank of make-up water heating tubes mounted above said free gas passage for the passage of hot gases thereover from said free passage, means for conducting make-up water from said first bank to said second bank and thence to the lower ends of said wall tubes for supplying make-up water to said wall tubes, and means for adjusting the flow of hot gases over said second bank of make-up water tubes.

13. A steam generating boiler comprising an upright shell of substantially uniform cross section throughout its length, burner means for the combustion of fuel positioned in the lower portion of said shell, said shell being effective as a draft stack to induce convection currents of hot gases upwardly therethrough from said burner means, a plurality of wall tubes in said shell adjacent the walls thereof for containing fluid medium of low enthalpy to protect the walls from excessive heat, superheater tubes within said shell disposed inwardly from one portion of the wall of said shell and extending toward the opposite side thereof and leaving a free gas passage between said superheater tubes and said wall tubes along said opposite side, said superheater tubes extending a substantial distance along said shell and being exposed to convection currents of hot gases rising from said burner means, steam drum means adjacent the upper ends of said tubes for receiving fluid medium from said wall tubes and for supplying steam to said superheater tubes, means for receiving superheated steam from said superheater tubes for delivery to a point of use, a first bank of fluid preheater tubes positioned above said superheater tubes in the path of the gases flowing upwardly from said superheater tubes, a second bank of fluid preheater tubes positioned above said free passage in the path of hot gases flowing upwardly from said passage, and means connecting said first and second banks of tubes in series and for connecting said second bank to deliver the preheated fluid medium to the lower ends of said wall tubes.

14. A steam generating boiler as set forth in claim 13 including means dependent upon the temperature of the gases discharged from said shell for controlling the amount of gas directed over said second bank of tubes.

15. A steam generating boiler comprising an upright shell of generally three-sided cross section, burners for the combustion of fuel positioned in the lower portion of said shell, said shell being effective as a draft stack to induce convection currents of hot gases upwardly therethrough from said burners, three groups of wall tubes in said shell adjacent the respective three walls thereof for containing water of low enthalpy to protect the walls from excessive heat, mud drums connected in communication with the lower ends of the wall tubes on each of the two side walls adjacent one apex of said cross section, a third mud drum near the lower end of said shell and extending between said apex and a position intermediate the sides of the third of said walls, said wall tubes on said third wall being bent inwardly from said wall from a plane above the mud drums on said side walls and sloping downwardly toward said apex and terminating along said third mud drum and in communication therewith, superheater tubes within said shell disposed inwardly from said third wall and extending toward said apex and leaving a free gas passage lying between said superheater tubes and said wall tubes adjacent said apex, said superheater tubes extending a substantial distance along said shell and being exposed to convection currents of hot gases rising from said burners, means connected in communication with the upper ends of all of said tubes to receive fluid from said wall tubes and to supply steam to said superheater tubes, means for collecting superheated steam from the lower ends of said superheater tubes for delivery to a point of use, make-up water heating means mounted above said superheater tubes for utilizing hot gases passing upwardly through said shell for heating make-up water, and means for conducting make-up water from said make-up water heating means to at least one of said mud drums adjacent said apex.

16. A steam generating boiler comprising an upright shell of substantially uniform cross section throughout its length, burner means for the combustion of fuel positioned in the lower portion of said shell, said shell being effective as a draft stack to induce convection currents of hot gases upwardly therethrough from said burner means, a plurality of wall tubes in said shell adjacent the walls thereof for containing fluid medium of low enthalpy to protect the walls from excessive heat, superheater tubes within said shell disposed inwardly from one portion of the wall of said shell and extending toward the opposite side thereof and leaving a free gas passage between said superheater tubes and said wall tubes along said opposite side, said superheater tubes extending a substantial distance along said shell and being exposed to convection currents of hot gases rising from said burner means, steam drum means adjacent the upper ends of said tubes for receiving fluid medium from said wall tubes and for supplying steam to said superheater tubes, and means for receiving superheated steam from said superheater tubes for delivery to a point of use, said burner means comprising two burner assemblies extending through the wall of said shell at substantially different respective elevations below said superheater, each of said two burner assemblies being operable independently and having full capacity for heating said boiler whereby the temperature of said superheating tubes may be adjusted by changing the heating operation from one to the other of said burner assemblies.

17. A steam generating boiler comprising an upright shell of substantially uniform cross section throughout its length, burner means for the combustion of fuel positioned in the lower portion of said shell, said shell being effective as a draft stack to induce convection currents of hot gases upwardly therethrough from said burner means, a plurality of wall tubes in said shell adjacent the walls thereof for containing fluid medium of low enthalpy to protect the walls from excessive heat, superheater tubes within said shell disposed inwardly from one portion of the wall of said shell and extending toward the opposite side thereof and leaving a free gas passage between said superheater tubes and said wall tubes along said opposite side, said superheater tubes extending a substantial distance along said shell and being exposed to convection currents of hot gases rising from said burner means, steam drum means adjacent the upper ends of said tubes for receiving fluid medium from said wall tubes and for supplying steam to said superheater tubes, means for receiving superheated steam from said superheater tubes for delivery to a point of use, means including mud drums connected in communication with the lower ends of said wall tubes for supplying fluid medium to said wall tubes, and electric heater means arranged in at least one of said mud drums for heating and vaporizing the medium therein whereby the temperature within said shell may be maintained substantially at the operating temperature when said burner means is not in operation and steam may be produced for starting of said boiler without requiring operation of said burner means whereby said superheater tubes may be supplied with steam before hot combustion gases are supplied from said burner means.

18. A unitary steam generating boiler and stack assembly comprising an upright shell of generally polygonal cross section and having two flat sides meeting along an apex, burners for the combustion of fuel positioned in the lower portion of said shell, said shell being effective as a draft stack to induce convection currents of hot gases upwardly therethrough from said burners, a plurality of wall tubes in said shell adjacent the walls thereof for containing fluid medium of low enthalpy to protect the walls from excessive heat, superheater tubes within said shell disposed inwardly from one wall thereof and extending toward said apex, said superheater tubes extending a substantial distance along said shell and being exposed to convection currents of hot gases rising from said burners, a steam drum mounted adjacent the outer side of said shell and connected in communication with the upper ends of all said tubes to receive fluid from said wall tubes and to supply fluid to said superheater tubes, a superheated steam drum connected to the lower ends of said superheater tubes to receive superheated steam therefrom for delivery to a point of use, means for feeding fluid medium to the lower ends of said wall tubes, means arranged in said shell above said wall tubes and utilizing the hot gases rising through said shell for heating air, a first duct means extending vertically along said shell outside one of said flat walls for supplying air to said air heating means, a second duct means extending vertically along said shell outside the other of said flat walls for supplying air from said heating means to said burners, and wall means of outwardly curved cross section extending between the edges of the respective flat walls for enclosing said duct means.

19. A steam generating boiler comprising an upright shell, burners for the combustion of fuel positioned in the lower portion of said shell, said shell being effective as a draft stack to induce convection currents of hot gases upwardly therethrough from said burners, a plurality of wall tubes in said shell adjacent the walls thereof for containing fluid medium of low enthalpy to protect the walls from excessive heat, superheater tubes within said shell disposed inwardly from one wall thereof, said superheater tubes extending a substantial distance along said shell and being exposed to convection currents of hot gases rising from said burners, said superheater tubes being arranged in a plurality of separate platens each comprising a multiplicity of tubes arranged in a pattern of generally triangular cross section having one side adjacent said one wall and having a longitudinal space of triangular configuration pointing inwardly from said one wall toward the opposite apex of the platen to provide a free passage for gases through said platen adjacent said one wall, a steam drum mounted adjacent the outer side of said shell and connected in communication with the upper ends of all of said tubes to receive fluid from said wall tubes and to supply fluid to said superheater tubes, a superheated steam drum connected to the lower ends of said superheater tubes to receive superheated steam therefrom for delivery to a point of use, and means for feeding fluid medium to the lower ends of said wall tubes.

20. A steam generating boiler as set forth in claim 19 including a baffle plate for controlling the passage of gases through said triangular space in said superheater.

21. A steam generating boiler comprising an upright shell of generally polygonal cross section, burners for the combustion of fuel positioned in the lower portion of said shell, said shell being effective as a draft stack to induce convection currents of hot gases upwardly therethrough from said burners, a plurality of wall tubes in said shell adjacent the walls thereof for containing fluid medium of low enthalpy to protect the walls from excessive heat, superheater tubes within said shell disposed inwardly from one wall and extending toward an opposite apex of the cross section of the shell and leaving a free gas passage lying between said superheater tubes and said wall tubes adjacent said apex, said superheater tubes extending a substantial distance along said shell and being exposed to convection currents of hot gases rising from said burners, said superheater tubes being arranged in a plurality of separate platens each comprising a multiplicity of tubes arranged in a pattern of generally triangular cross section and having a longitudinal space of triangular configuration pointing toward said apex from the opposite side of the platen to provide a free passage for gases through said platen adjacent said one wall, means including a reheat supply header for supplying steam for reheating, a header mounted outside said shell below said platens for receiving reheated steam and delivering it to a point of use, means for connecting at least one of said platens between said reheat supply header and said header for receiving the reheated steam, a steam drum mounted adjacent the outer side of said shell and connected in communication with the upper ends of all of said tubes to receive fluid from said wall tubes and to supply fluid to said superheater tubes, a superheated steam drum connected to the lower ends of said superheater tubes to receive superheated steam therefrom for delivery to a point of use, and means for feeding fluid medium to the lower ends of said wall tubes.

22. A unitary steam generating boiler and stack assembly comprising an upright shell of substantially uniform cross section, burners for the combustion of fuel positioned in the lower portion of said shell, said shell being effective as a draft stack to induce convection currents of hot gases upwardly therethrough from said burners, a plurality of wall tubes in said shell spaced from but near the walls thereof for containing fluid medium of low enthalpy to protect the walls from excessive heat, means for substantially preventing the passage of gases between said wall tubes from one side to the other thereof, means on said shell adjacent the upper ends of said tubes for suspending said tubes in said shell, means including a plurality of shoes rigidly secured to said tubes and frictionally engaging the inside wall of said shell for maintaining said tubes in spaced relation to said wall and for affording longitudinal extension and contraction of said tubes, an open top channel member extending around the interior of said shell adjacent the lower ends of said tubes, baffle means secured to said tubes adjacent their lower ends and entering said channel and terminating short of the bottom thereof whereby said channels may be filled with liquid to cooperate with said baffle and provide a liquid seal between the interior of said shell and the space between said tubes and said shell to prevent the passage of gases into the space between said tubes and said shell, and a packing of thermal insulation in the space between said tubes and said shell.

23. A steam generating boiler comprising an upright shell of substantially uniform cross section throughout its length, burner means for the combustion of fuel positioned in the lower portion of said shell, said shell being effective as a draft stack to induce convection currents of hot gases upwardly therethrough from said burner means, a plurality of wall tubes in said shell adjacent the walls thereof for containing fluid medium of low enthalpy to protect the walls from excessive heat, superheater tubes within said shell disposed inwardly from one portion of the wall of said shell and extending toward the opposite side thereof and leaving a free gas passage between said superheater tubes and said wall tubes along said opposite side, said superheater tubes extending a substantial distance along said shell and being exposed to convection currents of hot gases rising from said burner means, steam means adjacent the upper ends of said tubes for receiving fluid medium from said wall tubes and for supplying steam to said superheater tubes, means for receiving superheated steam from said superheater tubes for delivery to a point of use, a first bank of fluid preheater tubes positioned above said superheater tubes in the path of the gases flowing upwardly from said superheater tubes, a second bank of fluid preheater tubes positioned above said free passage in the path of hot gases flowing upwardly from said passage, means connecting said first and second banks of tubes in series and for connecting said second bank to deliver the preheated fluid medium to the lower ends of said wall tubes, and means dependent upon the level of fluid in said steam drum for controlling the supply of fluid to said preheater tubes.

24. A unitary steam generating boiler and stack assembly comprising an upright shell including a main wall and two flat side walls secured to the main wall and meeting one another along a vertical apex, burner means mounted on the lower portion of said main wall for the combustion of fuel, said main and side walls cooperating to provide a draft stack to induce convection currents of hot gases upwardly therethrough from said burner means, a boiler unit mounted on said main wall and comprising a plurality of wall tubes mounted in side by side relationship and a superheater including a multiplicity of tubes arranged outwardly from said main wall and extending toward said apex, each of said side walls having a plurality of water tubes mounted thereon in side by side relationship, a steam drum mounted adjacent the outer side of said main wall near the upper ends of said main wall tubes and connected in communication with the upper ends of said main wall tubes, means for connecting the upper ends of the wall tubes on said side walls to said steam drum for conducting fluid from said side wall tubes to said drum, means connecting said drum to said superheater, a superheated steam header mounted on said main wall on the outer side thereof and connected to the lower end of said superheater to receive superheated steam for delivery to a point of use, each of said side walls upon being detached from said main wall and the other side wall being swingable about said apex for opening said stack to afford incorporation and connection of a second boiler unit of the same construction as said first boiler thereby to provide increased boiler capacity of said assembly.

25. A unitary steam generating boiler and stack assambly as set forth in claim 24 wherein said wall tubes on said main wall are bent away from said wall in the lower portion thereof to provide a bottom wall, and a mud drum extending outwardly from said main wall and connected to the bottom ends of said main wall tubes.

26. A unitary steam generating boiler and stack assembly as set forth in claim 26 wherein a plurality of said main wall tubes are bent away from said main wall below said superheater to act as screen tubes and extend upwardly between said superheater and said apex and thence backwardly over said superheater to said steam drum for conducting fluid to said steam drum, said screen tubes turning back toward said steam drum short of said apex whereby a free gas passage is provided upwardly from said burners adjacent said apex.

27. A self-sufficient unitary steam generating boiler and stack assembly comprising an upright shell of substantially uniform cross section, burners for the combustion of fuel positioned in the lower portion of said shell whereby said shell is effective as a draft stack to produce therethrough continuous convection currents of upwardly flowing hot gases from said burners, a plurality of wall tubes in said shell spaced from and extending along the walls thereof for containing fluid medium of low enthalpy to protect the walls from excessive heat, a steam drum mounted on said shell adjacent the upper ends of said wall tubes and connected thereto for receiving steam therefrom, a superheater and an economizer and an air preheater arranged successively and in order one above the other in said stack for receiving heat from the combustion gases passing upwardly therethrough, means for delivering to said burners air heated in said air preheater, means dependent upon the temperature of gases discharged from said air preheater and controlling the flow of gases over said economizer for maintaining subtsantially constant the temperature of the gases discharged from said stack, a make-up water heating system including said economizer for facilitating the operation of the boiler with 100% raw make-up water supplied at temperatures as low as about 50° F., said make-up water system comprising a low pressure stage including said economizer for receiving heat from the combustion gases, a high pressure water preheating stage comprising a plurality of said wall tubes exposed to radiant heat in the combustion zone of said stack, a flash tank and a deaerator mounted on said stack and connected to receive fluid from said economizer, a boiler feed pump connected between said deaerator and said high pressure stage for pumping water from said low pressure stage into said high pressure stage, said wall tubes of said high pressure heating stage comprising a downflow group connected to receive water from said pump and an upflow group, said groups being connected at their lower ends to each other and the upflow group being connected to deliver water to said drum, said wall tubes being suspended from said shell at their upper ends and expanding downwardly upon increased temperature, water seal means comprising a trough adjacent the lower ends of said tubes and a baffle secured to said tubes and extending into said trough for preventing the passage of gases between said combustion chamber and the space between said wall tubes and said shell whereby substantial loss of heat from said combustion chamber to the space between said wall tubes and said wall of said boiler is prevented, and means for connecting said superheater to receive saturated steam from said drum and for delivering superheated steam from said superheater for use.

28. A salf-sufficient unitary steam generating boiler and stack assembly as set forth in claim 27 wherein the cross section of said shell is of generally three-sided configuration and the wall thereof comprising a main wall and two flat side walls secured to the main wall and meeting one another along a vertical apex, said wall tubes of said high pressure stage of said high pressure water preheating stage lying adjacent said apex in at least one of said side walls, and each of said side walls upon being detached from said main wall and the other side wall being swingable about said apex for opening said shell to afford incorporation and connection of a second similar boiler unit comprising a main wall and a superheater and economizer and air preheater of the same constructions as those of said first mentioned boiler thereby to provide increased boiler capacity of said assembly.

References Cited
UNITED STATES PATENTS

| | | | |
|---|---|---|---|
| 822,972 | 6/1906 | Moffat | 122—439 |
| 1,470,744 | 10/1923 | Jacobus | 122—444 X |
| 1,969,406 | 8/1934 | Kerr | 122—477 X |
| 2,149,477 | 3/1939 | Trede | 122—477 X |
| 2,211,903 | 8/1940 | McCarthy | 122—356 |
| 2,247,884 | 7/1941 | Kerr et al. | 122—480 |

KENNETH W. SPRAGUE, *Primary Examiner.*